(12) United States Patent
Schmidt et al.

(10) Patent No.: US 8,011,706 B2
(45) Date of Patent: Sep. 6, 2011

(54) SUCTION GRIPPER

(75) Inventors: Kolja Schmidt, Bremen (DE);
Wolfgang Echelmeyer,
Osterholz-Scharmbeck (DE); Hermann Franck, Ritterhude (DE)

(73) Assignee: Deutsche Post AG, Bonn (DE)

( * ) Notice: Subject to any disclaimer, the term of this patent is extended or adjusted under 35 U.S.C. 154(b) by 324 days.

(21) Appl. No.: 12/300,152

(22) PCT Filed: Mar. 16, 2007

(86) PCT No.: PCT/DE2007/000480
§ 371 (c)(1),
(2), (4) Date: Jan. 9, 2009

(87) PCT Pub. No.: WO2007/131463
PCT Pub. Date: Nov. 22, 2007

(65) Prior Publication Data
US 2009/0206619 A1    Aug. 20, 2009

(30) Foreign Application Priority Data
May 11, 2006   (DE) .................... 10 2006 022 277

(51) Int. Cl.
*B25J 15/06* (2006.01)
(52) U.S. Cl. ................. 294/2; 294/61; 294/64.1
(58) Field of Classification Search ............... 294/64.1, 294/64.2, 64.3, 65, 2, 61, 902; 901/40; 269/21
See application file for complete search history.

(56) References Cited

U.S. PATENT DOCUMENTS

| | | | | |
|---|---|---|---|---|
| 3,005,652 | A | * | 10/1961 | Helm ........................... 294/64.1 |
| 3,865,359 | A | * | 2/1975 | Caroli ............................ 269/21 |
| 4,799,854 | A | | 1/1989 | Niskala |
| 6,382,692 | B1 | * | 5/2002 | Schmalz et al. ............. 294/64.1 |
| 2004/0207219 | A1 | | 10/2004 | Schmierer |

FOREIGN PATENT DOCUMENTS

| | | |
|---|---|---|
| DE | 2650861 | 5/1978 |
| DE | 4000890 | 9/1990 |
| DE | EP0798955 | 10/1997 |
| DE | 19805018 | 8/1999 |
| DE | 10058608 | 5/2002 |
| DE | 10304169 | 8/2004 |
| DE | 102004045957 | 4/2006 |
| EP | 0845434 | 6/1998 |

OTHER PUBLICATIONS

International Preliminary Report on Patentability for International Application No. PCT/DE2007/000481 (English Translation).

* cited by examiner

*Primary Examiner* — Dean J Kramer
(74) *Attorney, Agent, or Firm* — International IP Law Group, P.C.

(57) ABSTRACT

There is provided a suction gripper. An exemplary suction gripper comprises at least one needle adapted to grip an object. Also provided is a method of gripping an object. An exemplary method of gripping an object comprises gripping the object with a suction gripper comprising at least one needle adapted to grip the object to a suction gripper body.

8 Claims, 5 Drawing Sheets

SUCTION GRIPPER

CROSS REFERENCE TO RELATED APPLICATIONS

Pursuant to 35 U.S.C. §371, this application is the United States National Stage Application of International Patent Application No. PCT/DE2007/000480, filed on Mar. 16, 2007, the contents of which are incorporated by reference as if set forth in their entirety herein, which claims priority to German (DE) Patent Application No. 10 2006 022 277.6, filed May 11, 2006, the contents of which are incorporated by reference as if set forth in their entirety herein.

BACKGROUND

The present invention relates to a suction gripper.

When, for example, a container that is loaded up to the ceiling has to be unloaded, one is often confronted with a solid wall of packages. In such a case, only the front of the packages is visible. This has the drawback that a package that has to be gripped only offers one contact surface and that there is very little freedom of movement. Since the loading procedure and/or the transportation often causes deformation and/or compression of the packages underneath the package that is going to be gripped, the package that has to be gripped is often in a kind of trough and is held in place by at times considerable clamping forces. Consequently, forces have to be applied to the package in two directions: on the one hand, upward forces to lift it out of the trough and on the other hand, forces perpendicular to the stack of packages in order to pull it out of the stack. The lifting is necessary here since otherwise, the lower package would also move or, in the worst-case scenario, the entire stack of packages would tip over.

When it comes to applying force perpendicular to the package, good results have been achieved so far with suction grippers such as, for example, bellows suction grippers, although these have the disadvantage that they let go in case of lateral forces which, until now, had made it impossible to lift packages by applying suction onto the front surface.

SUMMARY OF THE INVENTION

Therefore, an exemplary embodiment of the present invention relates to a suction gripper with which it is possible to lift packages, even when the suction is applied to the front surface.

According to an exemplary embodiment of the present invention, this may be achieved by a suction gripper, characterized in that at least one needle for gripping an object is provided. By appropriately selecting the number of needles, their length and their distribution density, appropriate gripping forces can be exerted onto a package.

Advantageously, the needle is arranged on a needle insert. Of course, several needles can be arranged on the needle insert.

Advantageously, the needle insert is replaceable. As a result, for example, the number of needles and/or their length and/or their distribution density can be varied as a function of the application case.

Advantageously, the needle insert can be retrofitted, that is to say, it can also be subsequently mounted onto already existing suction grippers.

According to another exemplary embodiment of the present invention, it can be provided that the needle insert can be screwed in.

As an alternative, the needle insert can also be clamped in place.

Advantageously, the needle insert can be mounted in a suction opening. If this is the only suction opening of the suction gripper, then, of course, the needle insert has to be mounted in it in such a way that the suction gripper still achieves its suction effect.

According to another exemplary embodiment of the present invention, the needle insert comprises a fastening sleeve for fastening it in the suction opening as well as a needle plate that is arranged on the front lengthwise end of the fastening sleeve and that extends at a right angle thereto, whereby the bore of the fastening sleeve is connected to the front of the needle insert by a connection opening in the needle insert.

Advantageously, at least one exposed ventilation slit is provided, which extends from the edge of the opening, on the one hand, in the needle plate towards the outside and, on the other hand, in the fastening sleeve towards the back lengthwise end of the fastening sleeve. This results in an optimal build-up of vacuum. Moreover, the needle insert itself is prevented from getting stuck due to the suction. Moreover, labels or the like from packages cannot clog the suction opening since it is located behind the needle plate.

According to another exemplary embodiment of the present invention, it can be provided that the suction gripper is a bellows suction gripper.

In particular, the suction opening can be arranged in the middle.

Finally, as an alternative, a suction gripper according to an exemplary embodiment of the present invention is a flat-surface suction gripper. The term flat-surface suction gripper refers to suction mats of the type manufactured, for example, by the Unigripper Company.

An exemplary embodiment of the present invention may be based on a realization that, through the combination of a suction gripper with at least one needle, the physical principle of action of suction grippers, namely, holding by means of a non-positive connection, is combined with the physical principle of action of needle grippers, namely, holding by means of a positive connection, as a result of which the application of force onto a package is augmented to three directions without damaging it to any considerable extent.

BRIEF DESCRIPTION OF THE DRAWINGS

Additional features and advantages of the invention can be gleaned from from the description below in which an embodiment is explained in detail with reference to an exemplary embodiment of the present invention on the basis of the schematic drawings, in which.

DETAILED DESCRIPTION OF SPECIFIC EMBODIMENTS

In the description below, the word "front" refers to the suction side or to the side facing an object that is to be gripped.

Figure 1:
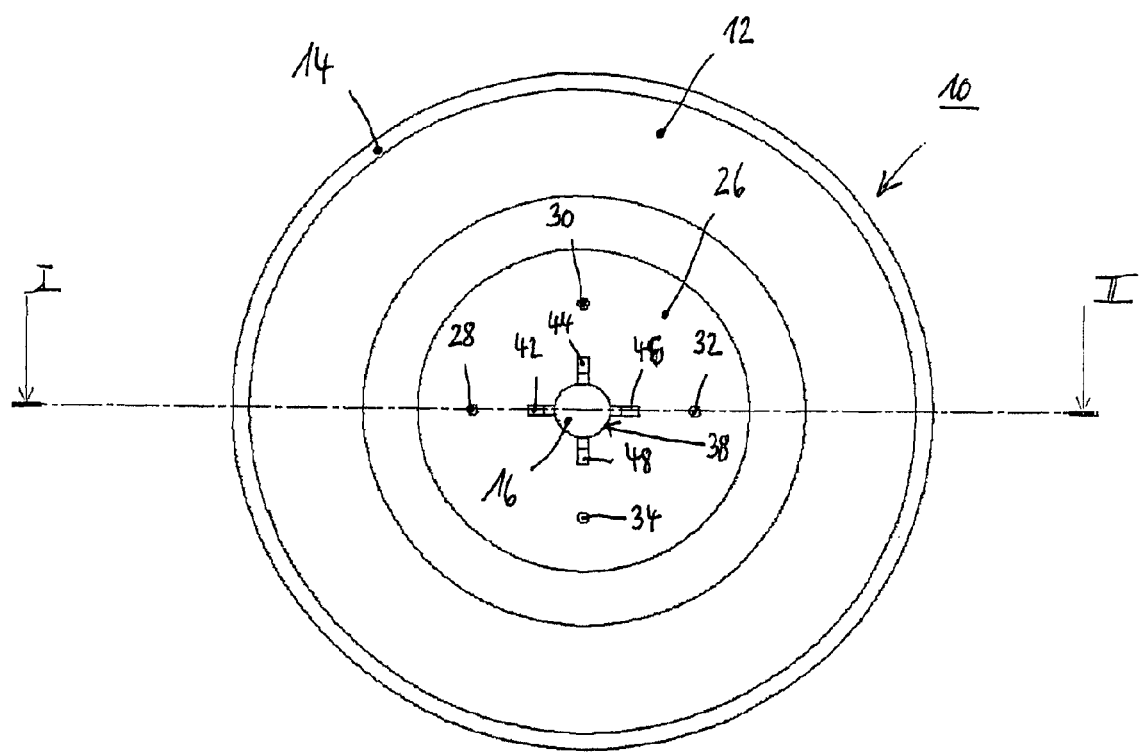
FIG. 1 is a diagram of a suction gripper according to an exemplary embodiment of the present invention in a view from below.
Figure 2:
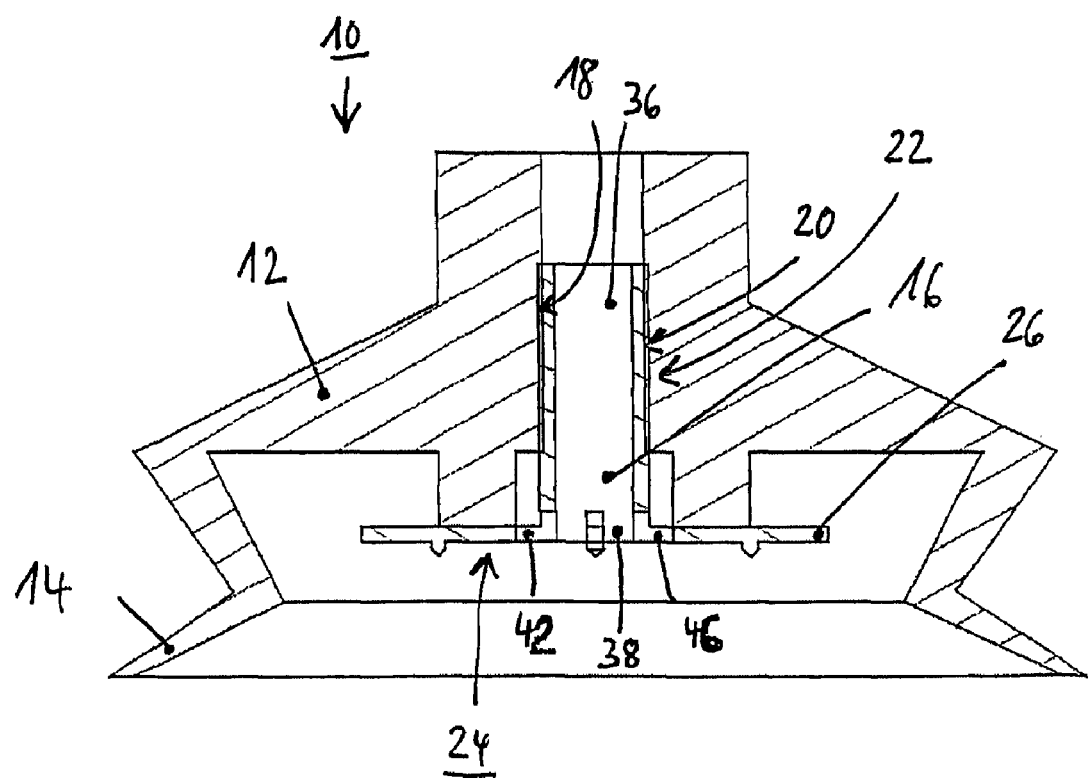
FIG. 2 is a sectional view along the line II-II of FIG. 1.
Figure 3:
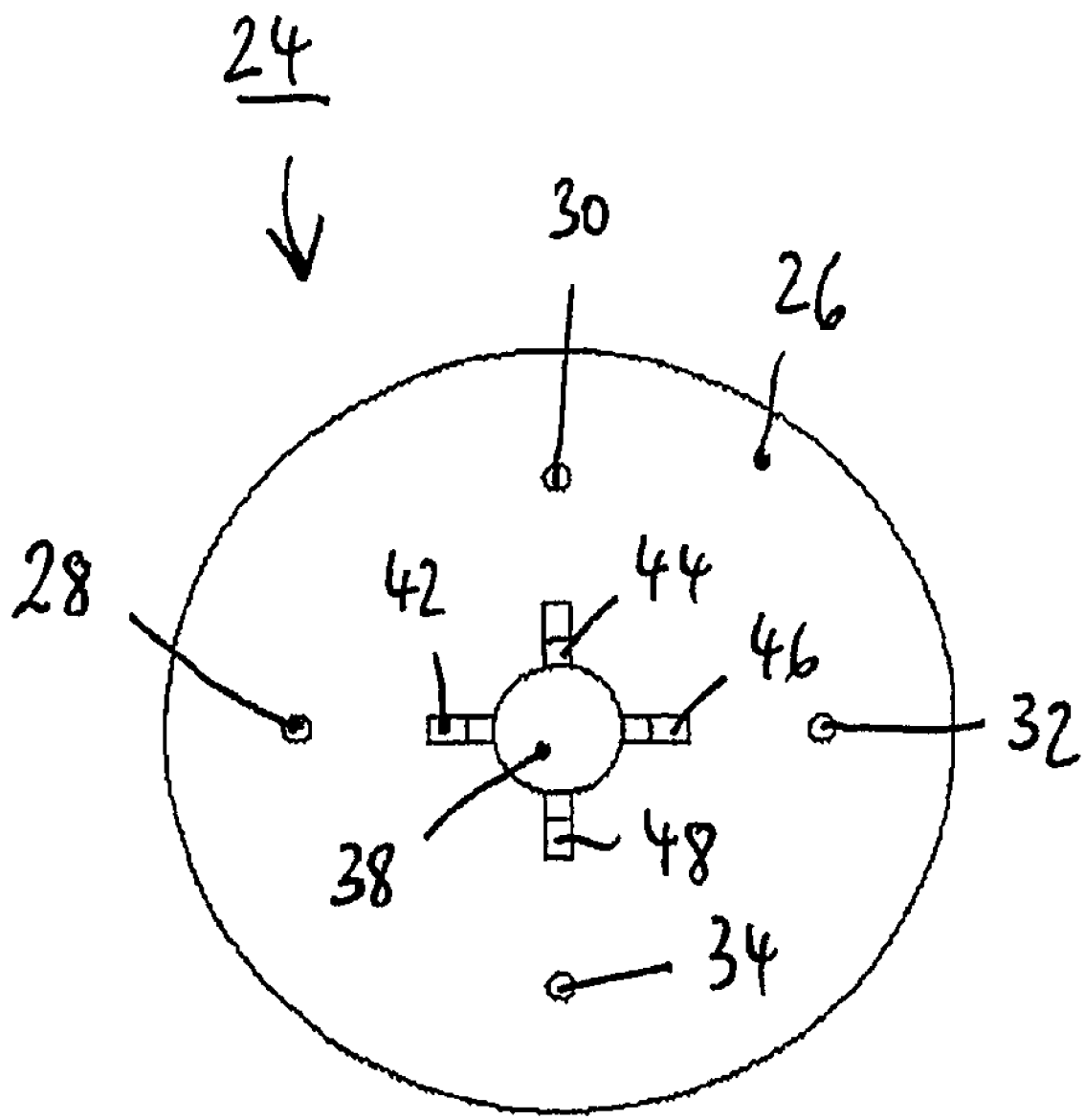
FIG. 3 is a diagram of the needle insert of the suction gripper of FIG. 1 in a view from below.
Figure 4:
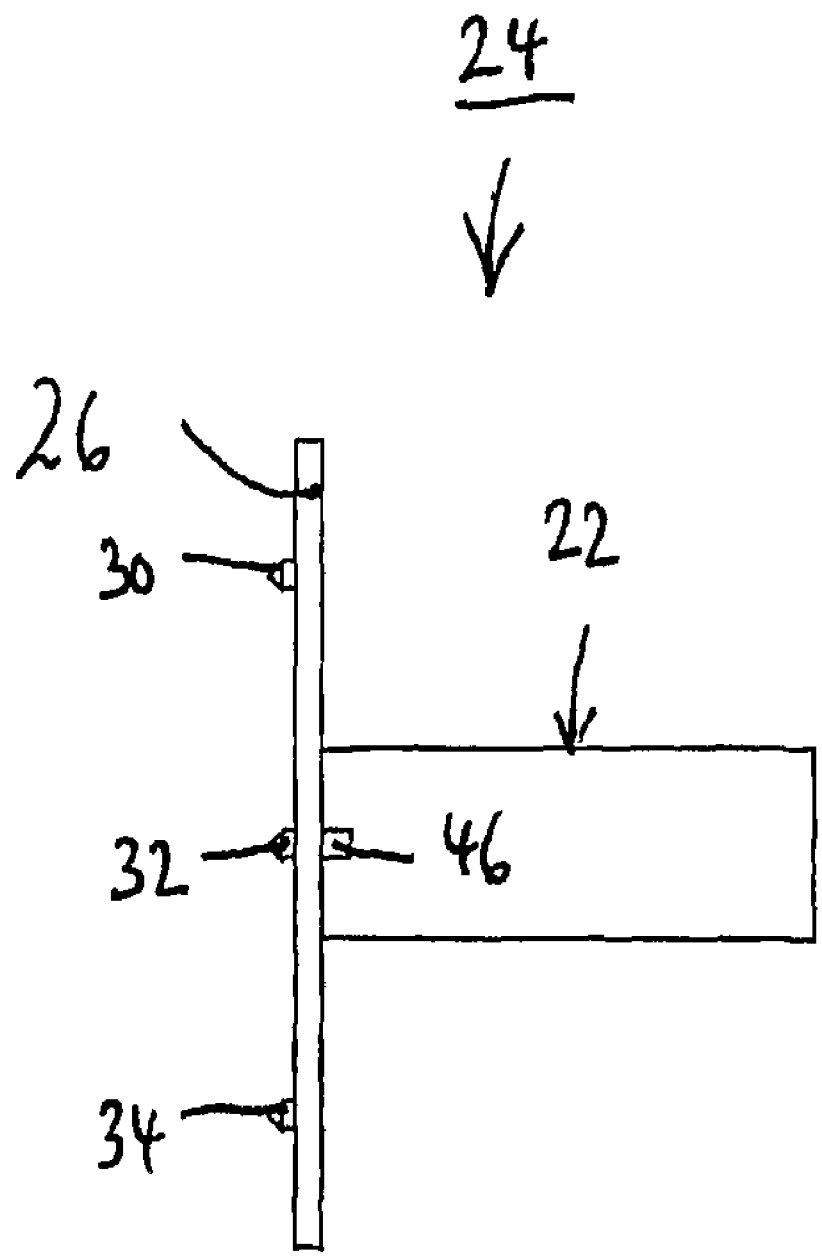
FIG. 4 is a diagram showing a side view of the needle insert of FIG. 3.
Figure 5:
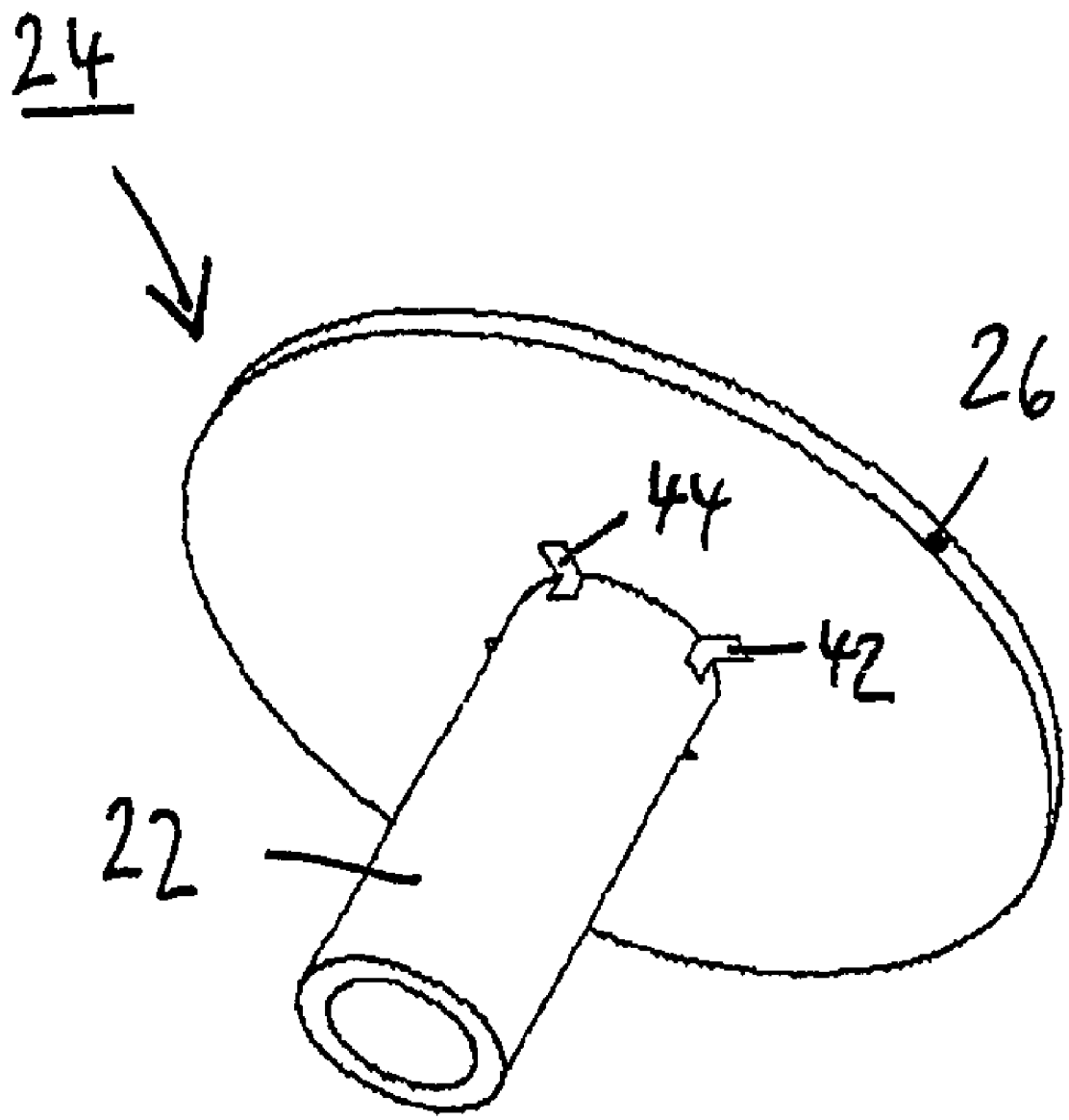
FIG. 5 is a perspective view of the needle insert of FIG. 4 from the back.

As can be seen in FIGS. 1 and 2, the suction gripper 10 is a bellows suction gripper with a bellows-like body 12 made of flexible plastic with a circumferential front sealing lip 14 and a centered rear suction opening 16 that can be connected to a source of negative pressure (not shown here). In the front end of the suction opening 16, there is an internal thread 18 into which the external thread 20 of the fastening sleeve 22 of a needle insert 24 is screwed. The needle insert 24 has a needle plate 26 that is arranged centered at the front end of the fastening sleeve 22 and that extends at a right angle thereto. The needle plate 26 is configured to be circular and encircles the body 12 laterally at a given distance and it also has four needles 28, 30, 32, and 34 spaced at 90° intervals on the same radius. The needles 28, 30, 32, and 34 extend in a forward direction, i.e. towards an object that is to be gripped and their length is in the vicinity of two to three millimeters. In order to maintain the suction function of the bellows suction gripper, the bore 36 of the fastening sleeve 22 is connected via a circular connection opening 38 to the front of the bellows suction gripper. Moreover, at the appertaining angular positions of the needles 28, 30, 32, and 34, there are exposed ventilation slits 40, 42, 44 and 46 that extend, on the one hand, from the edge of the connection opening 38 radially to the outside over a certain distance in the needle plate 26 and, on the other hand, in the fastening sleeve 22 over a certain distance in the direction of the rear lengthwise end of the fastening sleeve 22. As a result, a good build-up of vacuum is achieved. For this purpose, a vertical gap (not shown here) can be additionally provided between the needle plate 26 and the body 12. As an alternative, connection channels could be provided in the body 12 in order to produce a suction connection with the slits 46 and 48 on the back of the needle plate 26.

No deformation of the package occurs since the needles 28, 30, 32, and 34 are held in direct contact with the package surface by the negative pressure of the bellows suction gripper, due to the fact that the package surface is pulled onto the needles, so to speak, and since the needles are not pressed against the package until they penetrate it, as is the case with conventional needle grippers. Furthermore, the very short length of the needles and the stop created by the needle plate, which prevents puncturing, account for minimal damage to the package. Only superficial damage occurs in the form of a dotted pattern. The number and arrangement of the needles as well as the tight positive connection make it possible to exert a considerable amount of force in all lateral directions, preventing the holes from ripping under load.

The features of the invention disclosed in the description, in the drawings and in the claims can be essential either individually or in any desired combination for the implementation of the invention in its various embodiments.

What is claimed is:

1. A suction gripper, comprising a suction opening and at least one needle adapted to grip an object, wherein the needle is arranged on a needle insert and the needle insert is adapted to be mounted in the suction opening, wherein the needle insert comprises a fastening sleeve for fastening it in the suction opening of the suction gripper and a needle plate that is arranged on a front lengthwise end of the fastening sleeve and that extends at a right angle thereto, whereby a bore of the fastening sleeve is connected to a front of the needle insert by a connection opening in the needle insert.

2. The suction gripper recited in claim 1, wherein the needle insert is replaceable.

3. The suction gripper recited in claim 1, wherein the needle insert is adapted to be retrofitted.

4. The suction gripper recited in claim 1, wherein the needle insert is adapted to be screwed into the suction gripper.

5. The suction gripper recited in claim 1, wherein the suction opening is arranged in the middle.

6. The suction gripper recited in claim 1, comprising at least one exposed ventilation slit extending from an edge of an opening in the needle plate towards the outside and in the fastening sleeve toward a back lengthwise end of the fastening sleeve.

7. The suction gripper recited in claim 1, wherein the suction gripper is a bellows suction gripper.

8. The suction gripper recited in claim 1, wherein the suction gripper is a flat-surface suction gripper.

* * * * *